United States Patent

Sawada et al.

[11] Patent Number: 6,154,166
[45] Date of Patent: Nov. 28, 2000

[54] MICROWAVE DETECTOR

[75] Inventors: Motoshi Sawada; Yuichi Kajita; Mitsuhiro Imura; Shinji Koike; Akira Ito; Hisao Ono, all of Tokyo, Japan

[73] Assignee: Yupiteru Industries Co., Ltd., Japan

[21] Appl. No.: 09/162,347

[22] Filed: Sep. 28, 1998

[30] Foreign Application Priority Data

Oct. 20, 1997 [JP] Japan .................................. 9-303379

[51] Int. Cl.[7] .............................. G01S 7/40; H04B 17/00
[52] U.S. Cl. ........................... 342/20; 342/175; 342/195; 455/205; 455/226.1; 455/161.1
[58] Field of Search .................... 342/13, 14, 15, 342/16, 20, 175, 192, 193, 194, 195, 196, 197, 17, 18, 19, 89, 90; 455/226.1, 39, 67, 67.5, 130, 150.1, 161.1, 161.2, 168.1, 205, 207, 209, 214, 215, 227, 228, 269, 313, 334, 336, 337

[56] References Cited

U.S. PATENT DOCUMENTS

| | | | |
|---|---|---|---|
| 5,268,689 | 12/1993 | Ono et al. ................................. | 342/20 |
| 5,389,930 | 2/1995 | Ono .......................................... | 342/20 |
| 5,461,383 | 10/1995 | Ono et al. ................................. | 342/20 |
| 5,852,417 | 12/1998 | Valentine et al. ........................ | 342/20 |

OTHER PUBLICATIONS

"Road Patrol XK Wireless Hidden/Remote Radar Detector Features"; Faxback Doc. # 32788; on the Internet at support.tandy.com/support_auto/32788.html, Apr. 30, 1996.

"Traffic Enforcement in Victoria" on the Interenet at www-.netspace.net.au/~smack/traffic/rdd.html, no date

*Primary Examiner*—Bernarr E. Gregory
*Attorney, Agent, or Firm*—Marger Johnson & McCollom, P.C.

[57] ABSTRACT

In order to detect microwaves from radar type speed measurement devices and microwaves leaking out of reverse detectors without being detected by such reverse detectors, a microwave detector is provided with a super-heterodyne type reception circuit for cyclically performing reception operations to receive target microwave frequencies of prescribed microwave bands, the reception circuit including a first local oscillator which can carry out a fixed oscillation at a prescribed frequency or a sweep of a prescribed frequency range established slightly outside the frequency range of the local oscillator of a reverse detector, and a plurality of second local oscillators having different oscillation frequencies, whereby the reception circuit is able to receive microwaves in the target bands and microwaves leaking out of the local oscillator of a reverse detector.

15 Claims, 9 Drawing Sheets

FIG.5

| | Single Super | | | Double Super IF 1.05GHz | | | Double Super IF 1.6GHz | | | Double Super IF 1.05GHz |
|---|---|---|---|---|---|---|---|---|---|---|
| | A | B | C | A | B | C | A | B | C | |
| X1 | — | — | — | — | — | — | X | — | — | Reverse Detector |
| X2 | K | K | — | — | — | — | — | — | — | |
| X3 | — | Ka | Ka | Ka | Ka | Ka | — | Ka | Ka | |

MICROWAVE DETECTOR

BACKGROUND OF THE INVENTION

1. Field of the Invention

The present invention relates to a microwave detector capable of detecting reverse detectors which are used to detect the presence of microwave detectors which emit an alarm upon detecting the microwave frequencies emitted by speed measurement devices.

2. Description of the Prior Art

Microwave detectors which generate an alarm upon detecting microwaves having the specific microwave frequencies emitted by radar type speed measurement devices are known in the prior art. Omitting a detailed description of the circuit construction, such microwave detectors generally operate by means of an antenna which picks up microwaves arriving from outside and a super-heterodyne type receiver circuit which receives microwave signals. Further, by sweeping the output frequency of a local oscillator in the related receiver circuit, such microwave detectors are able to ensure that the reception band width includes the microwave frequency of the detection target. Further, the local oscillator repeatedly carries out only a single sweep of the frequencies within the reception band width for each operation time period.

At this time, if a microwave frequency within the reception band width is present, the receiver circuit outputs two peaks P within a prescribed time interval t. In this way, because the microwave frequency of the detection target is fixed for the time interval t, the presence or absence of a microwave signal from the detection target can be determined by whether or not a pair of peaks P are present within the time interval t.

On the other hand, microwaves having prescribed frequencies leak out from the local oscillator provided in the microwave detector. Thus, by detecting such microwave frequencies leaking out from the related local oscillator, it is possible to construct reverse detectors to detect the presence of a microwave detector.

In this connection, because such reverse detectors also detect prescribed microwave frequencies, their basic detection principle is the same as that used by microwave detectors for detecting radar type speed measurement devices, and therefore such reverse detectors also include an internal local oscillator. Accordingly, microwaves having prescribed frequencies also leak out from the local oscillator of such reverse detectors.

Thus, by detecting the microwaves that leak out from the local oscillator of such reverse detectors, it becomes possible to detect reverse detectors. Further, as will be described below, because there is a different wave generation state for the microwave leaking from the microwave detector, the microwave leaking from the reverse detector and the microwave outputted from the radar type speed measurement device, it is possible to discriminate the signal generation source based on such differences.

Accordingly, in the example case where a reverse detector is detected, it is possible to suspend operations of the microwave detector for a prescribed period of time in order to suppress the generation of microwaves leaking out from the local oscillator housed internally in the microwave detector. In this way, it is possible to prevent the microwave detector from being detected by a reverse detection process. However, this method is not preferred because the essential process of detecting radar type speed measurement devices is temporarily suspended when the operations of the microwave detector are suspended for such prescribed period of time.

SUMMARY OF THE INVENTION

In view of the background described above, it is an object of the present invention to overcome the problems of the prior art state above by providing a microwave detector which can detect the presence of reverse detectors without being detected by such reverse detectors, and which can continually carry out operations to detect target microwaves even when a reverse detector is detected. It is another object of the present invention to provide a microwave detector which can carry out accurate detection operations to discriminate between microwave transmission sources even when the microwave frequencies are the same.

In particular, the specific microwave frequency ranges used by radar type speed measurement devices are as follows:

X band: 10.475~10.575 [GHz]
K band: 24.000~24.250 [GHz]
Ka band: 33.400~36.000 [GHz]

On the other hand, the first local oscillator of microwave detectors generally used in the prior art carry out a prescribed band sweep over the frequency range 11.200~11.800 [GHz].

In accordance with this, a reverse detector has a single super-heterodyne system which uses an intermediate frequency band amplifier to amplify signals around 10.7 MHz in order to detect the signals which leak out of the local oscillator of a microwave detector. Further, the local oscillator housed in such reverse detector generally uses a frequency range of 11.300~ 11.800 [GHz].

Further, because the purity of the signals of the local oscillators of microwave detectors and reverse detectors is weak, such local oscillators also leak relatively strong secondary higher harmonics and tertiary higher harmonics in addition to the microwave frequencies described above. In particular, the specific higher harmonic frequency ranges which leak out of a local oscillator of a reverse detector are listed below in Table 1.

TABLE 1

| | |
|---|---|
| 2nd Higher Harmonic: | 22.600~23.600 [GHz] |
| 3rd Higher Harmonic: | 33.900~35.400 [GHz] |
| 4th Higher Harmonic: | 45.200~47.200 [GHz] |
| 5th Higher Harmonic: | 56.500~59.000 [GHz] |
| ⋮ | |
| 10th Higher Harmonic: | 113~118 [GHz] |

Consequently, in addition to being able to carry out reverse detection in the fundamental frequency range, a reverse detector can also carry out reverse detection in any of the above nth higher harmonic frequency ranges. Accordingly, by setting the sweep frequency range and the higher harmonics thereof of the first local oscillator used in a microwave detector outside the possible reverse detection frequency bands listed above, it is possible to avoid reverse detection. However, as the order of the higher harmonics increases, the sensitivity decreases. Thus, because the actual utilization of higher harmonics up to an nth order contribute to the performance of a reverse detector, it is necessary to estimate an appropriate nth order reception when establishing the actual frequency ranges of the first local oscillator.

Further, if the sweep frequency is simply set outside the reverse detection frequency range, it may not be possible to detect the microwaves from radar type speed measurement devices. In response to this, the base frequency range that is swept by the first local oscillator is set at a value shifted slightly away from the reverse detection frequency range. In this way, each of the higher harmonics of such base frequency are also set slightly outside the reverse detection frequency range.

However, even if the sweep frequency is shifted in this way, the amount of shift is small. Thus, because the frequency of the intermediate frequency amplifier of the microwave detector increases as the sweep frequency moves farther away from the reverse detection frequency range, there is an increasing risk that the higher harmonics of the sweep frequencies will enter the reverse detection range.

Thus, by establishing the prescribed frequency band within a region that avoids reverse detection and the above-described problems related to local oscillators, it is possible to set oscillation frequencies for each of the local oscillators based on such established frequency range.

In this connection, in order to accomplish the requirements stated above, the microwave detector according to the present invention comprises a super-heterodyne type reception means for cyclically performing reception operations to receive target microwave frequencies of prescribed microwave bands, the reception means including a first local oscillator which can carry out a fixed oscillation at a prescribed frequency or a sweep of a prescribed frequency range established outside the frequency range of a local oscillator in a reverse detector, and a plurality of second local oscillators having different oscillation frequencies, wherein the reception means is adapted to receive microwaves in the target bands and microwaves leaking out of the local oscillator of the reverse detector when the oscillation frequencies of the plurality of second local oscillators is swept within the established frequency range of the first local oscillator, and wherein the higher harmonics of the frequency ranges of the plurality of second local oscillators lies outside the higher harmonic reception band of the reverse detector; first switching means which can be switched between a first position which bypasses the plurality of second local oscillators in order to establish a single super-heterodyne mode for the reception means, and a second position which does not bypass the plurality of second local oscillators in order to establish a double super-heterodyne mode for the reception means, wherein during operations in the double super-heterodyne mode, one of the plurality of second local oscillators is selected to have its output undergo frequency mixing with signals based on reception signals; comparing means for comparing a detection output outputted from the reception means with a threshold value in order to detect microwave frequencies of a detection target; judgement means for judging the presence or absence of detection target microwaves based on output signals from the comparing means; and alarm means for outputting an alarm when the judgement means detects a detection target microwave.

Further, in view of actual usage, the prescribed frequency range swept by the first local oscillator should wholly or partially include the frequency range 11.8 GHz~12.5 GHz or the frequency range 10.72 GHz~11.3 GHz. This range is for the case in which it is presumed that reception is possible up to the 10'th order higher harmonic of the local oscillator of a reverse detector. In this connection, even in the case corresponding to reception up to the 10'th order higher harmonic, frequencies above 13.11 GHz and below 10.27 GHz lie outside the higher harmonic reception range, and even though usable frequencies are present, if such separated frequencies are used, the frequencies passing through and amplified by the intermediate frequency amplifier of the reception means are increased, and this makes it impractical to use such frequencies. For this reason, the range described above is established.

Accordingly, in the cases where the presumed order of the higher harmonic which can be received by a reverse detector is greater than the 10'th order or smaller than the 10'th order, the width of the region lying outside the higher harmonic reception range changes, but in order for the frequency of the intermediate frequency amplifier to not increase very much, the above-described frequency range is preferred in case where the order is low. Further, in situations up to the case where the order is much larger than the 10'th order, it is possible to make the range narrower than the above-described frequency range, but in terms of practicality, at the 10'th order higher harmonic there are many cases in which it is not possible to ensure the previously established sensitivity capable of reception, and for this reason the above-described frequency range corresponding to the case up to the 10'th order higher harmonic is sufficient.

Furthermore, in the present invention, the judgement means is adapted to receive microwaves when the first local oscillator is carrying out a sweeping operation or a fixed oscillation, and in the case where the first local oscillator is oscillating at a fixed frequency, the judgement means carries out a function to discriminate whether or not a signal is from a reverse detector based on the detection state of the reception signals.

In this connection, the present invention can carry out such discrimination process based on various detection states. For example, when the detection state comprises the change in time interval of pairs of detection signals, the judgement means judges a reverse detector to be present in the case where the time intervals of the pairs of detection signals is fairly regular.

Further, when the detection state comprises the number of times a pair of detection signals is generated, the judgement means judges a reverse detector to be present in the case where the number of generated pairs of detection signals lies within a prescribed range.

Furthermore, the subsequent operations need to be changed in accordance with the discrimination results made by the judgement means. For example, a first alarm is outputted in the case where a target microwave is detected, and a second alarm different from the first alarm is outputted in the case where a reverse detector is detected. Further, the judgement means is equipped with a function to prevent an alarm from being outputted in the case where neither a target microwave nor a reverse detector is detected.

BRIEF DESCRIPTION OF THE DRAWINGS

FIG. 5 is a chart showing the relationship between the detectable bands and each of the super-heterodyne modes.

DETAILED DESCRIPTION OF THE PREFERRED EMBODIMENTS

Figure 1:
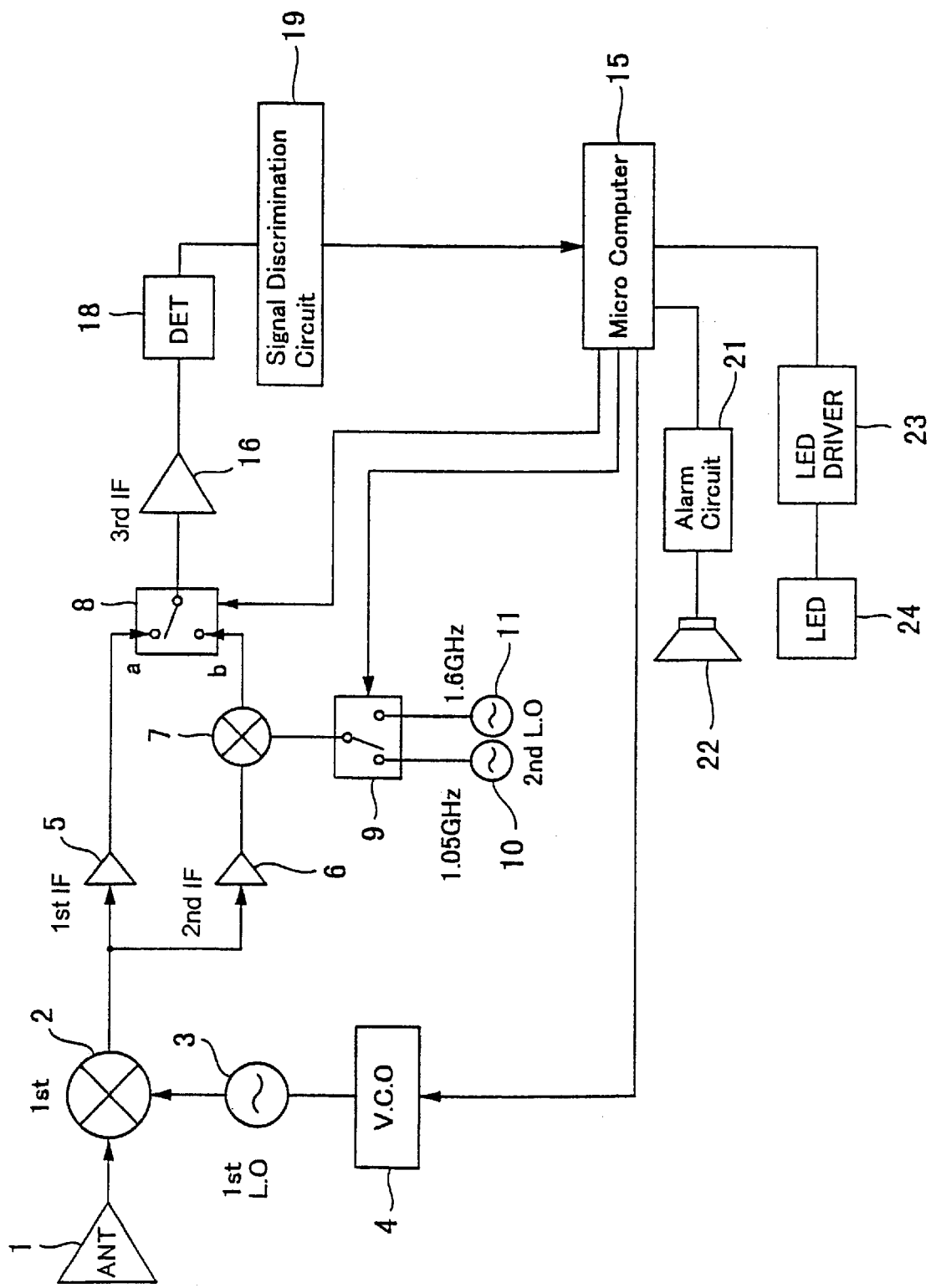
FIG. 1 is a schematic view of a microwave detector according to a preferred embodiment.

General traffic monitoring radar type speed measurement devices employ a plurality of microwave frequency bands, including the 10 GHz band (X band), 24 GHz band (K band) and 35 GHz band (Ka band). Accordingly, in order to carry out detection no matter which microwave frequency band is used, the local oscillator of the super-heterodyne type receiver circuit carries out a sequential sweep of prescribed frequency ranges which correspond to such frequency bands.

In particular, the specific microwave frequency ranges used by rader type speed measurement devices are as follows:

X band: 10.475~10.575 [GHz]
K band: 24.000~24.250 [GHz]
Ka band: 33.400~36.000 [GHz]

On the other hand, the first local oscillator of microwave detectors generally used in the prior art carries out a prescribed band sweep over the frequency range 11.200~11.800 [GHz].

In accordance with this, a reverse detector has a single super-heterodyne system which uses an intermediate frequency band amplifier to amplify signals around 10.7 MHz, in order to detect the signals which leak out of the local oscillator of a microwave detector. Further, the oscillator housed in such reverse detector generally uses a frequency range of 11.300~11.800 [GHz].

Further, because the purity of the signals of the local oscillators of microwave detectors and reverse detectors is weak, such local oscillators also leak relatively strong secondary higher harmonics and tertiary higher harmonics in addition to the microwave frequencies described above. In particular, the specific higher harmonic frequency ranges which leak out of a local oscillator of a reverse detector are listed below in Table 1.

TABLE 1

| | |
|---|---|
| 2nd Higher Harmonic: | 22.600~23.600 [GHz] |
| 3rd Higher Harmonic: | 33.900~35.400 [GHz] |
| 4th Higher Harmonic: | 45.200~47.200 [GHz] |
| 5th Higher Harmonic: | 56.500~59.000 [GHz] |
| ⋮ | |
| 10th Higher Harmonic: | 113~118 [GHz] |

Consequently, in addition to being able to carry out reverse detection in the fundamental frequency range, a reverse detector can also carry out reverse detection in any of the above nth higher harmonic frequency ranges. Accordingly, by setting the sweep frequency range and the higher harmonics thereof of the first local oscillator used in a microwave detector outside the possible reverse detection frequency bands listed above, it is possible to avoid reverse detection. However, as the order of the higher harmonics increases. the sensitivity decreases. Thus, because the actual utilization of higher harmonics up to an nth order contribute to the performance of a reverse detector, it is necessary to estimate an appropriate nth order reception when establishing the actual frequency ranges of the first local oscillator.

Further, if the sweep frequency is simply set outside the reverse detection frequency range, it may not be possible to detect the microwaves from radar type speed measurement devices. In response to this, the base frequency range that is swept by the first local oscillator is set at a value shifted slightly away from the reverse detection frequency range. In this way, each of the higher harmonics of such base frequency are also set slightly outside the reverse detection frequency range.

However, even if the sweep frequency is shifted in this way, the amount of shift is small. Thus, because the frequency of the intermediate frequency amplifier of the microwave detector increases as the sweep frequency moves father away from the reverse detection frequency range, there is an increasing risk that the higher harmonics of the sweep frequencies will enter the reverse detection range.

Thus, by establishing the prescribed frequency band within a region that avoids reverse detection and the above-described problems related to local oscillators, it is possible to set oscillation frequencies for each of the local oscillators based on such established frequency range.

FIG. 1 is an outline view showing the structure of a microwave detector according to an embodiment of the present invention. As shown in FIG. 1, microwaves from outside are picked up by a horn antenna 1 and mixed in a first mixer 2 with the output from a first local oscillator 3. As will be described below, the first local oscillator 3 comprises a voltage controlled variable frequency oscillator (VCO) which repeatedly sweeps a prescribed frequency range based on the waveform shaping of the sweep voltage. Further, in addition to containing a base frequency wave, the output of the first local oscillator 3 also includes a secondary high harmonic having a frequency twice that of the base frequency wave and a tertiary high harmonic having a frequency three times that of the base frequency wave, and these higher harmonics are positively utilized in the present embodiment.

The mixed output of the first mixer 2 is sent to a first intermediate frequency band amplifier 5 and a second intermediate frequency band amplifier 6 which are alternately selected by a changeover switch 8 located in the next step of the circuit. Each of the intermediate frequency band amplifiers 5, 6 amplifies and then outputs a prescribed band signal. In particular, the first intermediate frequency band amplifier 5 carries out amplification at 10.7 MHz, while the second intermediate frequency band amplifier 6 carries out amplification at 1.05 GHz and 1.6 GHz. Furthermore, the signals amplified by the second intermediate frequency band amplifier 6 are inputted into a second mixer 7. Further, the second mixer 7 is selectively connected to one of a pair of second local oscillators 10, 11 by means of a second changeover switch 9. Accordingly, the signals amplified by the second intermediate frequency band amplifier 6 undergo frequency mixing in the second mixer 7 with the output signals of either one of the pair of second local oscillators 10, 11.

In other words, a single super-heterodyne reception mode is established when the first changeover switch 8 is connect to point a, and a double super-heterodyne reception mode is established when the first changeover switch 8 is connect to point b. Furthermore, in the case where the first changeover switch 8 is connected to point b, the switching operations of the second changeover switch 9 change the outputted frequency, and this makes it possible (as will be described below) to carry out a process to detect the prescribed microwave frequencies emitted by typical radar type speed measurement devices, as well as making it possible to carry out a process to detect the presence of reverse detectors used to detect the present microwave detector. In this connection, the switching operations of the first changeover switch 8 and the second changeover switch 9 are carried out based on control signals outputted from a microcomputer 15.

The signals outputted from the first intermediate frequency band amplifier 5 and the signals outputted from the second mixer 7 are sent to a third intermediate frequency band amplifier 16 via the first changeover switch 8, and after amplification is carried out on signals lying in a prescribed frequency band (10.7 MHz), such signals then sent to a wave detector 18 which detects signals having a frequency of 10.7 MHz.

At this point, it is to be noted that in the present embodiment the frequency range of the first local oscillator 3 operated based on the VCO 4 of the microwave detector is 11.83~12.20 [GHz]. As a general rule, this range is repeatedly swept. Further, as will be described below, it is possible to carry out oscillation at a fixed frequency not swept within a prescribed timing. Also, the control of such oscillation can be carried out based on control signals from the microcomputer 15. Furthermore, as described below, the first local oscillator 3 can also positively utilize the second higher harmonic and the third higher harmonic in addition to the fundamental frequency.

Further, the oscillation frequency of the second local oscillator 10 is 1.05 GHz, and this fundamental frequency and its second higher harmonic is positively utilized. Further, the oscillation frequency of the second local oscillator 11 is 1.60 GHz, and this fundamental frequency is the only frequency positively utilized.

In the basic operation of the present embodiment, at the same time the sweeping operations of the first local oscillator 3 are carried out, the connecting point of the first changeover switch 8 is alternately switched at a prescribed timing for swept frequency units, and this makes it possible to establish a double super-heterodyne mode and a single super-heterodyne mode. In this way, by using a prescribed mode for the mixed output comprised of the inputted signal and the output of the first local oscillator 3 shown below, it becomes possible to carry out detection in a plurality of bands.

TABLE 2

X band (10.475 GHz~10.575 GHz)

Fundamental frequency of first local oscillator 3
Second local oscillator 11 (1.6 GHz)
Double super-heterodyne mode reception
K band (24.000 GHz~24.250 GHz)

2nd higher harmonic of first local oscillator 3
Single super-heterodyne mode reception
Partial Ka band (33.40 GHz~34.50 GHz)

3rd higher harmonic of first local oscillator 3
2nd higher harmonic of second local oscillator 10 (2.1 GHz)
Double super-heterodyne mode reception
Partial Ka band (34.50 GHz~35.55 GHz)

3rd higher harmonic of first local oscillator 3
Second local oscillator 10 (1.05 GHz)
Double super-heterodyne mode reception
Partial Ka band (35.50 GHz~36.00 GHz)

TABLE 2-continued

3rd higher harmonic of first local oscillator 3
Single super-heterodyne mode reception
Partial Ka band (33.90 GHz~34.50 GHz)

3rd higher harmonic of first local oscillator 3
Second local oscillator 11 (1.6 GHz)
Double super-heterodyne mode reception Now, even in the particular case where there is no fourth process, it is possible to cover the entire range of the Ka band (33.4~36 GHz), but because this is done using the higher harmonics, the reception sensitivity is lowered, whereby the possibility of detection leakage associated therewith is eliminated.

In the case where the microwave detector targets the above-mentioned traffic monitoring radar type speed measurement devices, the double super-heterodyne mode can be used to detect X band and Ka band. Further, the single super-heterodyne mode can be used to detect K band.

In this connection, it should be noted that even though the approximately 400 MHz sweep width of the first local oscillator 3 is not particularly large, by repeating the sweep alternately in the double super-heterodyne and single super-heterodyne reception modes, it becomes possible to completely cover not only the X band and the K band, but the relatively wide Ka band as well.

In this way, in the case where the microwave detector targets the above-mentioned traffic monitoring radar type speed measurement devices, the X band detection target band width of approximately 100 MHz and the K band detection target band width of approximately 200 MHz are relatively narrow. On the other hand, the Ka band detection target band of 33.400~36.000 GHz (having a band width of 2.6 GHz) is considerably wide. Accordingly, the present invention is able to avoid the problem of delayed detection due to the wasted effort in sweeping useless excess frequency ranges during X band and K band detection operations in the case where the frequency sweep range is simply set at a fixed value.

Further, because the single super-heterodyne reception circuit is established by bypassing the second mixing step in the double super-heterodyne reception circuit and guiding the first mixed output to the wave detector, the overall circuit does not become particularly complex.

Figure 2:
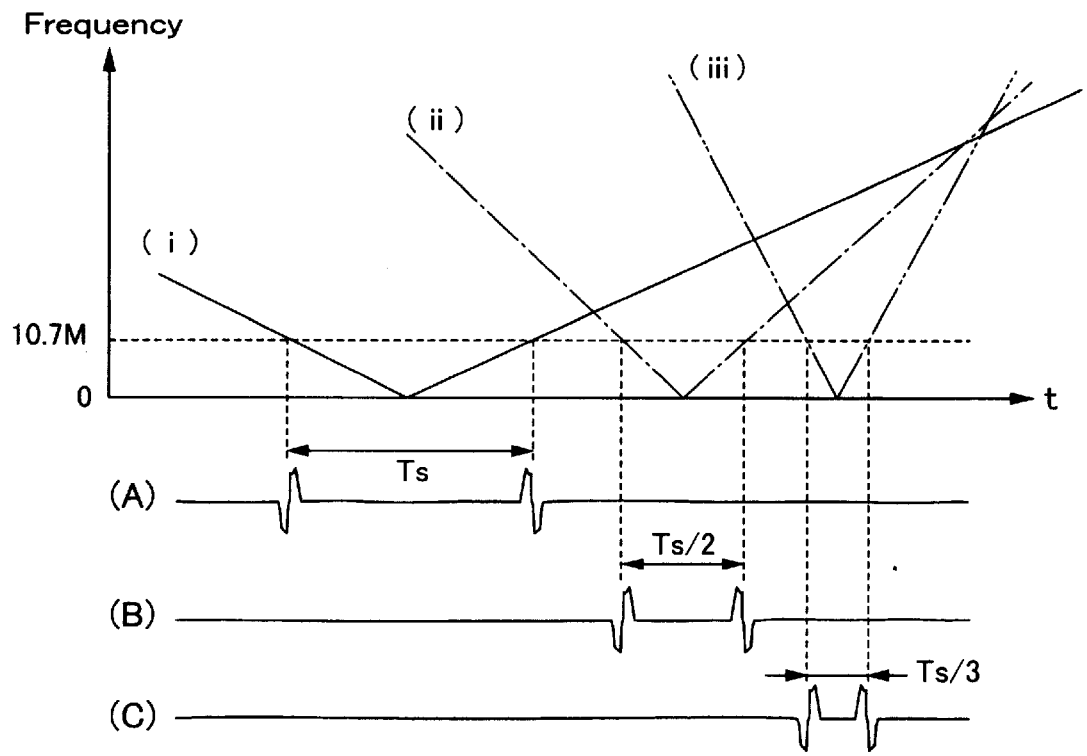
FIG. 2 is a conceptual diagram showing the distribution of the reception sensitivity band in the preferred embodiment of the present invention.

Next, the circuit after the wave detector 18 will be described. In this connection, FIG. 2 shows the relationship between the wave detection output (a) and the change in the inputted frequency of the wave detector 18. Wave detection output (a) can be any one of waveforms (A), (B), or (C) below. Further, in FIG. 2, (i) indicates the frequency change of the mixed signal comprised of the inputted signal and the fundamental frequency of the first local oscillator 3, (ii) indicates the frequency change of the mixed signal comprised of the inputted signal and the secondary higher harmonic, and (iii) indicates the frequency change of the mixed signal comprised of the inputted signal and the tertiary higher harmonic.

In the case where the inputted signal lies in the detectable frequency range, the inputted frequency passes once through 10.7 MHz, reaches zero, and then passes through 10.7 MHz again, whereby the wave detector 18 outputs a wave detection signal (a) comprised of a pair of left and right symmetrical pulses along the time axis. If the sweep rate of the first local oscillator is constant, and if the frequency variation rate of the mixed signal (i) based on the fundamental frequency is defined as Vf, then the frequency variation rate of the mixed signal (ii) based on the secondary higher harmonic will be twice that of Vf (i.e., 2Vf), and the frequency variation rate of the mixed signal (iii) based on the tertiary higher harmonic will be three times that of Vf (i.e., 3Vf).

Accordingly, the pulse period of the wave detection signal (a) detected from the mixed signal (i) is Ts (from waveform (A)), the pulse period of the wave detection signal (a) detected from the mixed signal (ii) is ½Ts (from waveform (B)), and the pulse period of the wave detection signal (a) detected from the mixed signal (iii) is ⅓Ts (from waveform (C)). Based on this, when the wave detection signal (a) is generated, the input signal which generates such wave detection signal (a) can be discriminated from any of the X band, K band and Ka band.

Figure 3:
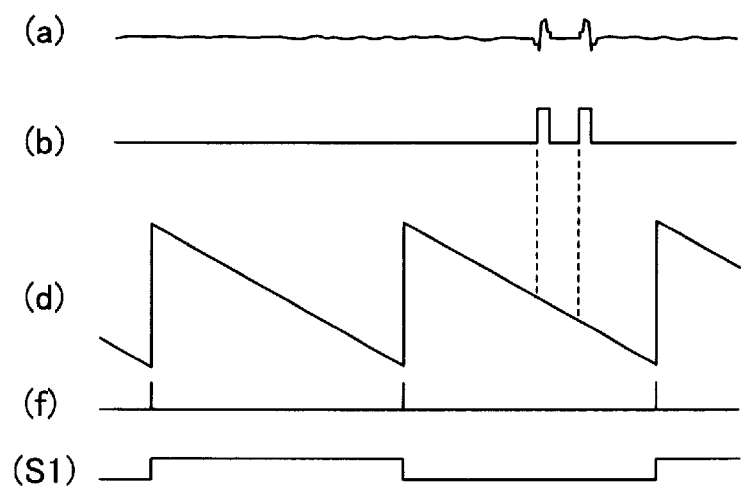
FIG. 3 is a diagram showing the principal part of the signal waveform in the preferred embodiment of the present invention.

Next, with reference to FIG. 3, a detailed description will be given for a processing system, a sweep control system and a reception mode switching control system for the output (a) of the wave detector 18 in the microwave detector shown in FIG. 1. First, the output of the wave detector 18 is sent to a signal discrimination circuit 19 (which functions as a comparing means) where it is compared with a threshold value (threshold voltage), and if the output of the wave detector 18 is higher than the threshold value, the signal discrimination circuit 19 outputs a "High" signal. In this way, by setting an appropriate threshold value, the judgment signal (b) outputted from the signal discrimination circuit 19 is "High" only when the microwave frequency of the detection target is received, and "Low" at all other times, as shown in FIG. 3(*b*).

This judgement signal (b) is inputted to a microcomputer 15 (seen in FIG. 1) to undergo a prescribed confirmation process. In the case where the microcomputer 15 confirms that the judgment signal (b) is due to the input of the microwave frequency of the detection target, the microcomputer 15 activates an alarm circuit 21 to emit an alarm using a speaker 22. Further, the microcomputer 15 simultaneously carries out a process to discriminate the band (i.e., discriminate among the X band, K band and Ka band) of the inputted signal from the time interval of the pair of detected pulses, with such discrimination results forming the basis for changing the activation pattern of the alarm circuit 21. Further, in the present embodiment, the output of the microcomputer 15 is connected to an LED drive 23 which can be operated to control the lighting up of an LED 24. In this way, by controlling the lighting up of the LED 24, it becomes possible to emit an additional alarm. In this connection, the detection process described above form the normal operations of the microwave detector.

At this point, it should be noted that in the present invention, operations described below are carried out in accordance with control signals from the microcomputer 15, whereby a judgement can be made as to whether the signals detected by the signal discrimination circuit 19 are signals outputted from a radar type speed measurement device or microwaves leaking from the local oscillator of a reverse detector. Furthermore, in the present embodiment it is possible to carry out a discrimination to determine whether or not such signals are microwaves leaking from the local oscillator of another microwave detector. In such case, the related judgement process is also carried out by the microcomputer 15.

Judgement as to whether or not Microwave is Outputted from a Speed Measurement Device A discrimination process is carried out to determine whether the received signal is a swept wave or unswept wave, and in the case where it is an unswept wave, it is judged that such signal is from a detection target traffic monitoring radar type speed measurement device (Doppler radar). In other words, in the case of Doppler radar, a prescribed frequency for each of the above-described bands is used, and even though the specific values of such frequencies are not known, the frequencies used are fixed. On the other hand, because the local oscillators of reverse detectors and microwave detectors used in other vehicles carry out sweeping operations, the frequency signals that leak out of such devices varies with time. Thus, by carrying out the operations described below, it becomes possible to carry out a discrimination process.

Figure 10:
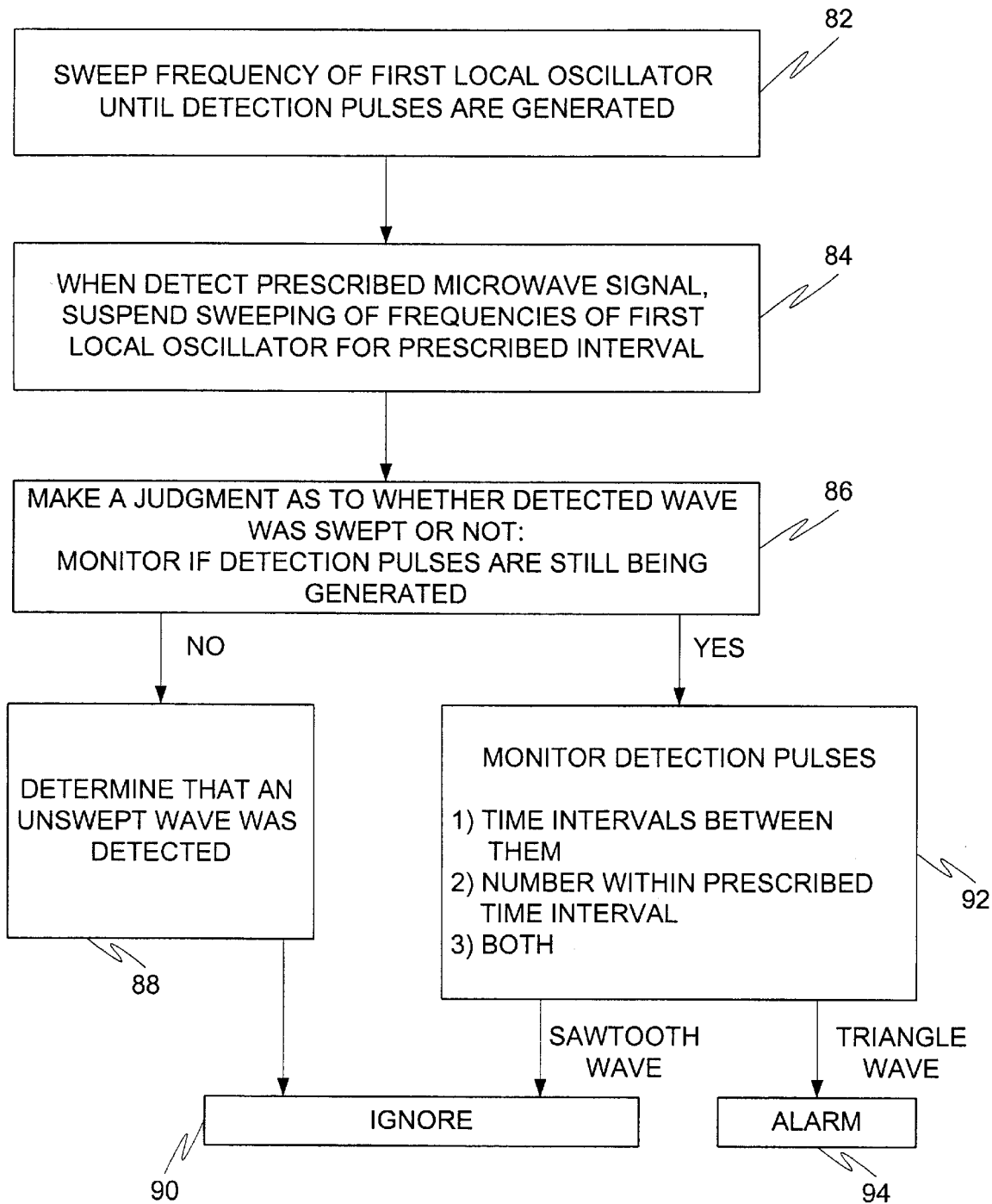
FIG. 10 is a flowchart illustrating a method according to the invention.

A method of the invention is now described with reference to FIG. 10.

STEP 1

Referring to box 82, during a search mode, a normal detection process is carried out. Namely, the first local oscillator 3 carries out a sweeping operation, switching after each cycle between a single super-heterodyne mode and a double super-heterodyne mode, and when operating in the double super-heterodyne mode, such operations are carried out while switching between the second local oscillators 10 and 11. As an example of such switching operations, the first changeover switch 8 is first connected to point "a" to establish a single super-heterodyne mode, in which the entire K band and part of the Ka band is searched. Next, the first changeover switch 8 is switched to point "b", and at the same time the second changeover switch 9 is connected to the second local oscillator 10. In this way, a double super-heterodyne mode is established for the second local oscillator 10 (1.05 GHz), in which the entire Ka band is searched. Then, the second changeover switch 9 is switched to form a connection with the second local oscillator 1. In this way, a double super-heterodyne mode is established for the second local oscillator 11 (1.6 GHz), in which the entire X band and part of the Ka band is searched. In this way, it becomes possible to completely search all the bands.

STEP 2

Referring to box 84, when a prescribed microwave signal is detected as a result of the process carried out in STEP 1 above, the sweeping operation of the first local oscillator 3 is suspended from the next cycle, and then the first local oscillator 3 is oscillated at a prescribed fixed frequency for a prescribed period of time. For example, such oscillation can be carried out at 12.10 GHz for a period of 300 ms. Further, by connecting the first changeover switch 8 to the point "b" and the second changeover switch 9 to the second local oscillator 10, it is possible to operate in a frequency fixed double super-heterodyne mode.

STEP 3

Referring to box 86, during a determination mode, as a result of the process carried out in STEP 1 above, when the detection signal is detected, a swept wave judgement is made, and when the detection signal is not detected, an unswept wave judgement is made. Namely, the frequency of the signal received form the antenna changes because the signal from the local oscillator of the targeted reverse detector is swept. In the case where the received signal is a signal from a local oscillator of a reverse detector, because the frequency of such signal will change as the local oscillator of the reverse detector performs a sweeping operation, even when the first local oscillator 3 oscillates at a fixed frequency, the received signal (i.e. the changing frequency of the received signal) will eventually intersect the fixed frequency, and as a result the discrimination circuit 19 will output a detection signal. In the case of an unswept wave, no intersection occurs, and therefore no detection signal is outputted.

Accordingly, in the case where a detection signal exists when the sweeping state of the first local oscillator is suspended, the received signal detected in STEP 1 is judged (box 92) to be a swept wave, namely, a wave which has leaked out from the local oscillator of a reverse detector or another vehicle microwave detector. Further, in the case where there is no detection signal, the received signal detected in STEP 1 is judged (box 90) to be an unswept wave, namely, a microwave emitted from a detection target Doppler radar, in which case it can be ignored (box 90). Thus, in such case where the received signal is judged to be a detection target microwave, the alarm circuit 21 is activated (box 94) to output a prescribed alarm, as described above.

Figure 4:
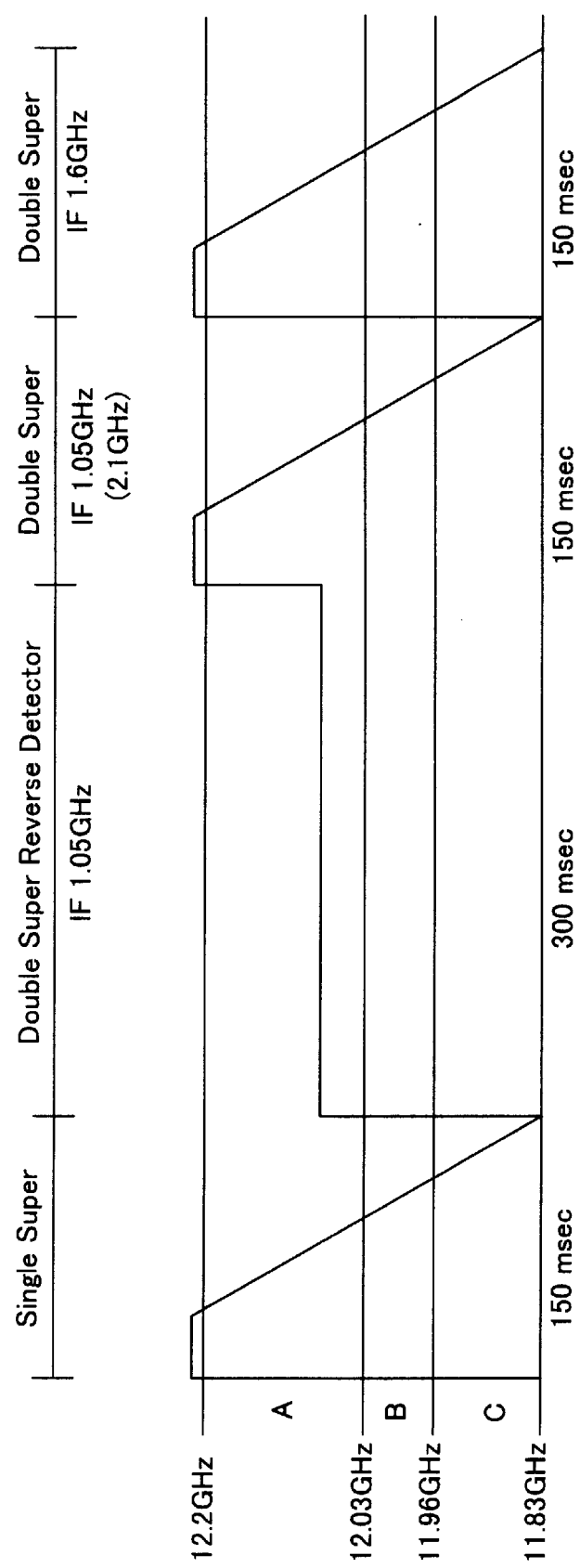
FIG. 4 is a diagram showing an example change in oscillation frequency with respect to time for the first local oscillator.

Now, in the embodiment described above, operations do not shift to STEP 2 unless a microwave signal is detected in STEP 1, but as shown in FIG. 4, regardless of how the microwave is detected, a step may be carried out to cause the first local oscillator 3 to oscillate at a fixed frequency for a prescribed period of time. Further, the relationship between the detection bands and each mode is shown in FIG. 5.

Discriminating between a Reverse Detector and a Microwave Detector

METHOD 1 (Difference of Sweeping Waveform)

Figure 6:
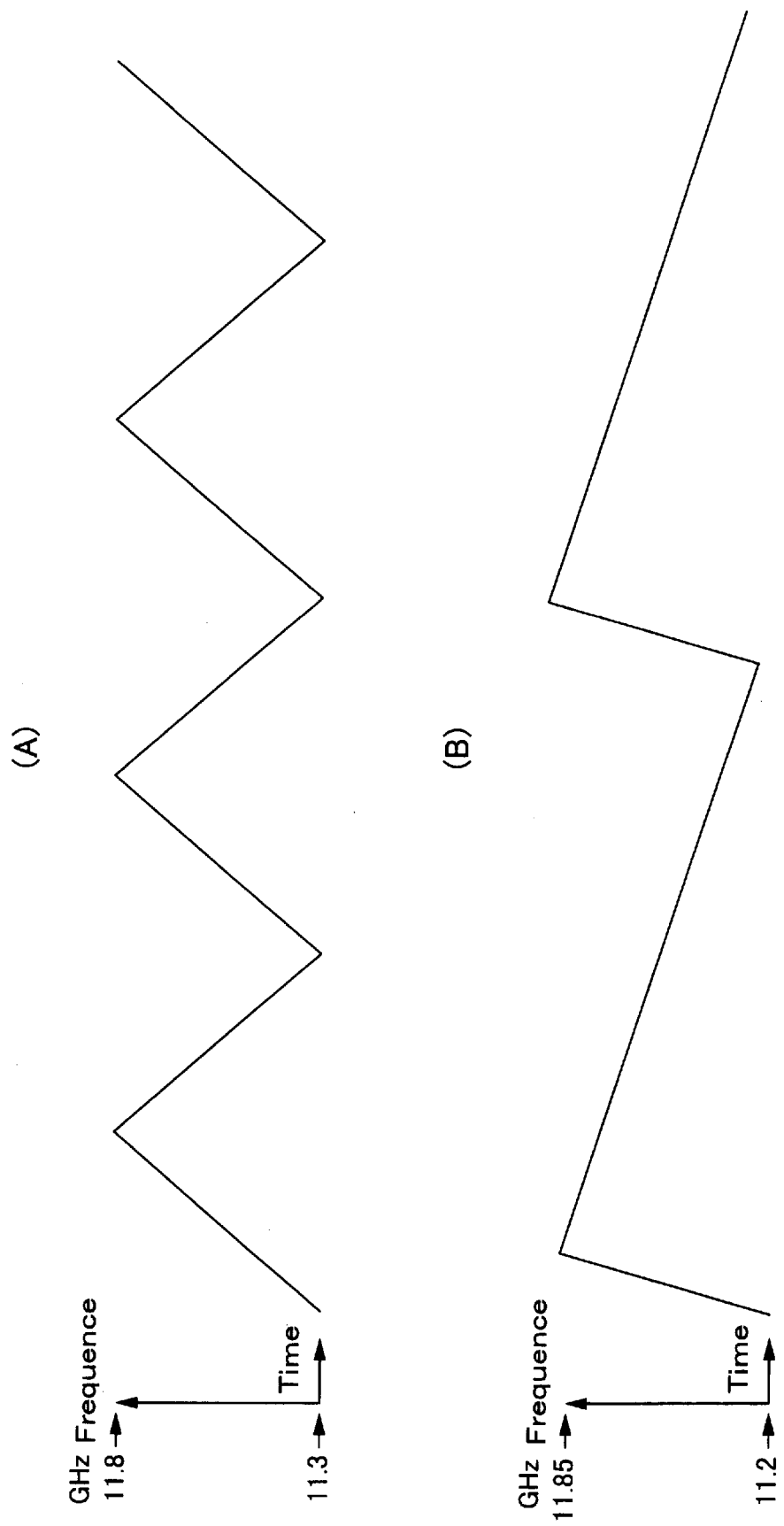
FIGS. 6(A) and 6(B) make up a diagram showing example sweep waveforms of local oscillators included in reverse detectors and microwave detectors.

In the case where a detection signal occurs during STEP 3, such detection signal indicates the presence of a microwave leaking out of the local oscillator of either a reverse detector or a microwave detector mounted in another vehicle. In the case of a reverse detector, the user needs to be informed of such fact, while in the case of a microwave detector in another vehicle, the user does not need to be informed of such fact. In this connection, it is possible to discriminate between these two sources by observing the difference of their sweeping waveforms. Namely, the sweeping waveform generally used in the local oscillator of reverse detectors is a triangular waveform like that shown in FIG. 6(A), and the sweeping waveform used in the local oscillator of microwave detectors is a saw-tooth waveform like that shown in FIG. 6(B). Accordingly, based on the differences of such transmitted waveforms, it is possible to discriminate between a reverse detector and another microwave detector from the difference between such waveforms and the present state of the detection signal. The specific process for carrying out such discrimination is described below.

Namely, after the sweeping operation of the first local oscillator 3 is suspended, the first local oscillator is made to oscillate at a prescribed fixed frequency for a prescribed period of time in a manner similar to that described above in STEP 2. Then, in the case where the generation of the pair of detection signals occurs at regular intervals, a triangular waveform is judged to exist, whereby a reverse detector is judged to be present. On the other hand, in the case where the spacing between the pair of detection signals is different each time such detection signals are generated, a saw-tooth waveform is judged to exist, whereby another microwave detector is judged to be present. In this connection, the principle which enables such judgements to be carried out is described below.

For example, the first local oscillator 3 is made to transmit at a frequency of 12.10 GHz for 300 ms. During this time, the first changeover switch 8 is connected to point "b", the second changeover switch 9 is connected to the second local oscillator 10 (1.05 GHz), the second intermediate frequency band amplifier 6 and second mixer 7 are used to establish in a double super-heterodyne mode, and the third intermediate frequency amplifier 16 (10.7 MHz) is operated as a second intermediate frequency amplifier in the double superheterodyne mode. During this time, the second higher harmonic oscillation frequency of a reverse detector is received by using the second higher harmonic of the first local oscillator 3.

Accordingly, the reception frequency of the microwave detector is as follows:

$$(12.10 \text{ GHz} \times 2) - (1.05 \text{ GHz} \pm 10.7 \text{ MHz}) = 23.15 \text{ GHz} \pm 10.7 \text{ MHz} \qquad \text{[Equation 1]}$$

Further, because this frequency is the second higher harmonic of the reverse detector, ½ this frequency (i.e., 11.575 GHz±5.35 MHz) becomes the fundamental frequency of the reverse detector.

Figure 7:
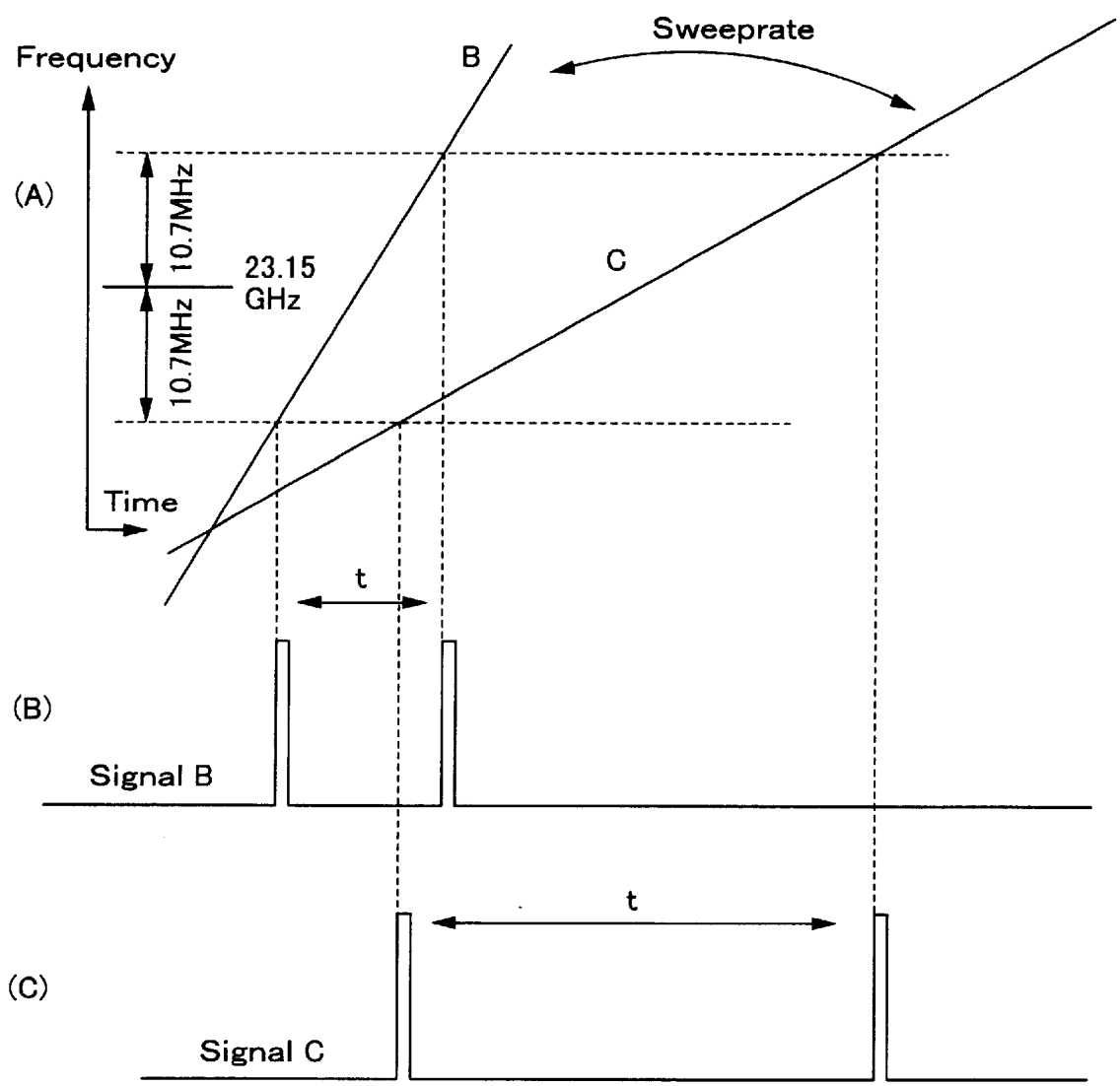
FIGS. 7(A), 7(B), and 7(C) make up a diagram illustrating the difference in the appearance of detection signals based on differences in sweep rates.

Accordingly, as shown in FIG. 7(A), when the reception frequency rises at a prescribed rate, two pulses are outputted as reception signals, such as those shown in FIGS. 7(B) & 7(C) respectively for the signals B and C. Thus, in the case of the signal B where the sweep rate (i.e., the change in frequency per unit time) is relatively large, the time interval "t" between the two fixed frequency points 23.15 GHz±10.7 MHz where the signal B is intersected is relatively short (See FIG. 7(B)). On the other hand, in the case of the signal C where the sweep rate (i.e., the change in frequency per unit time) is relatively small, the time interval "t" between the two fixed frequency points 23.15 GHz±10.7 MHz where the signal C is intersected is relatively long (See FIG. 7(B)).

Figure 8:
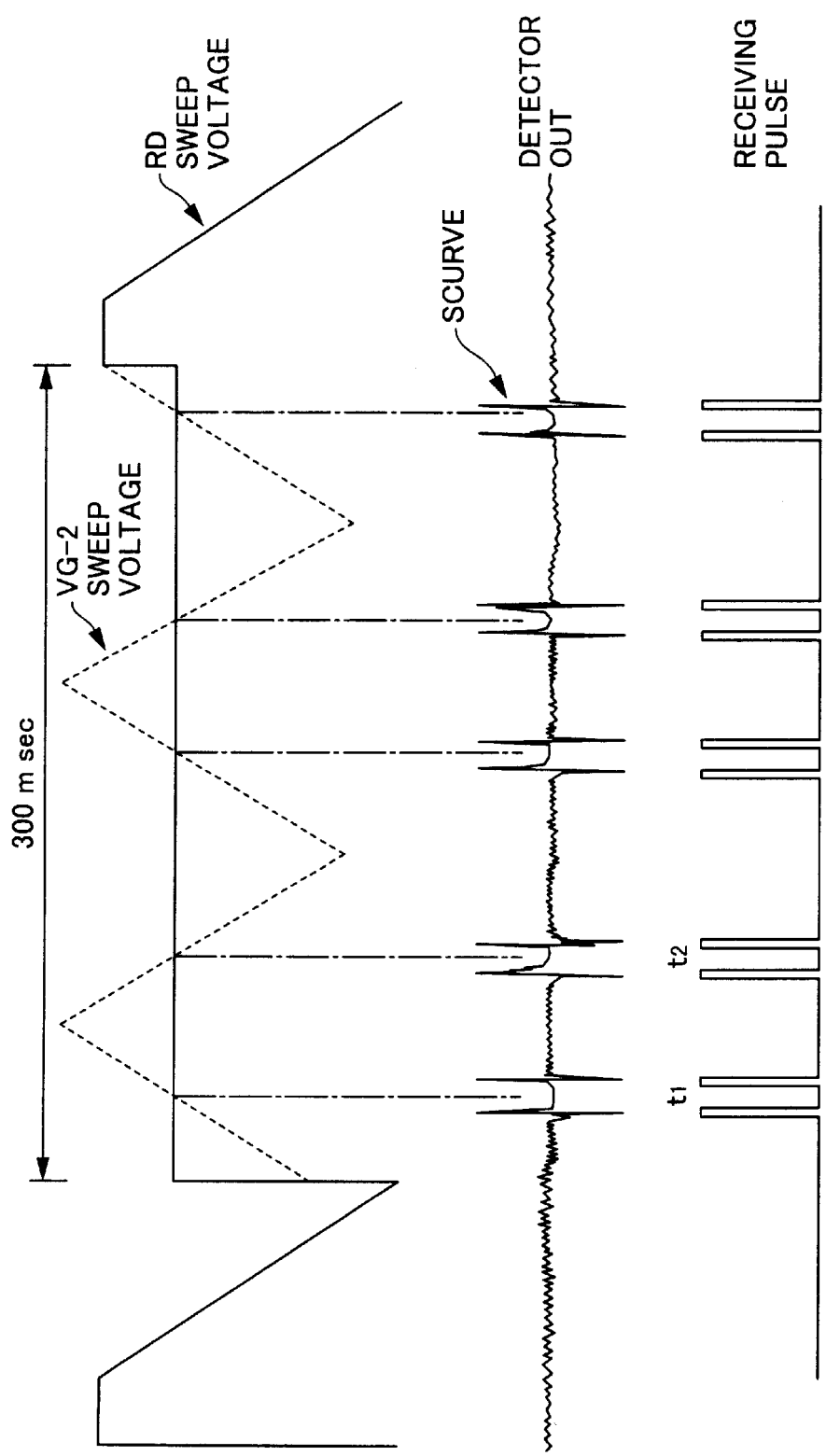
FIG. 8 is a diagram illustrating operations in a reverse detector.
Figure 9:
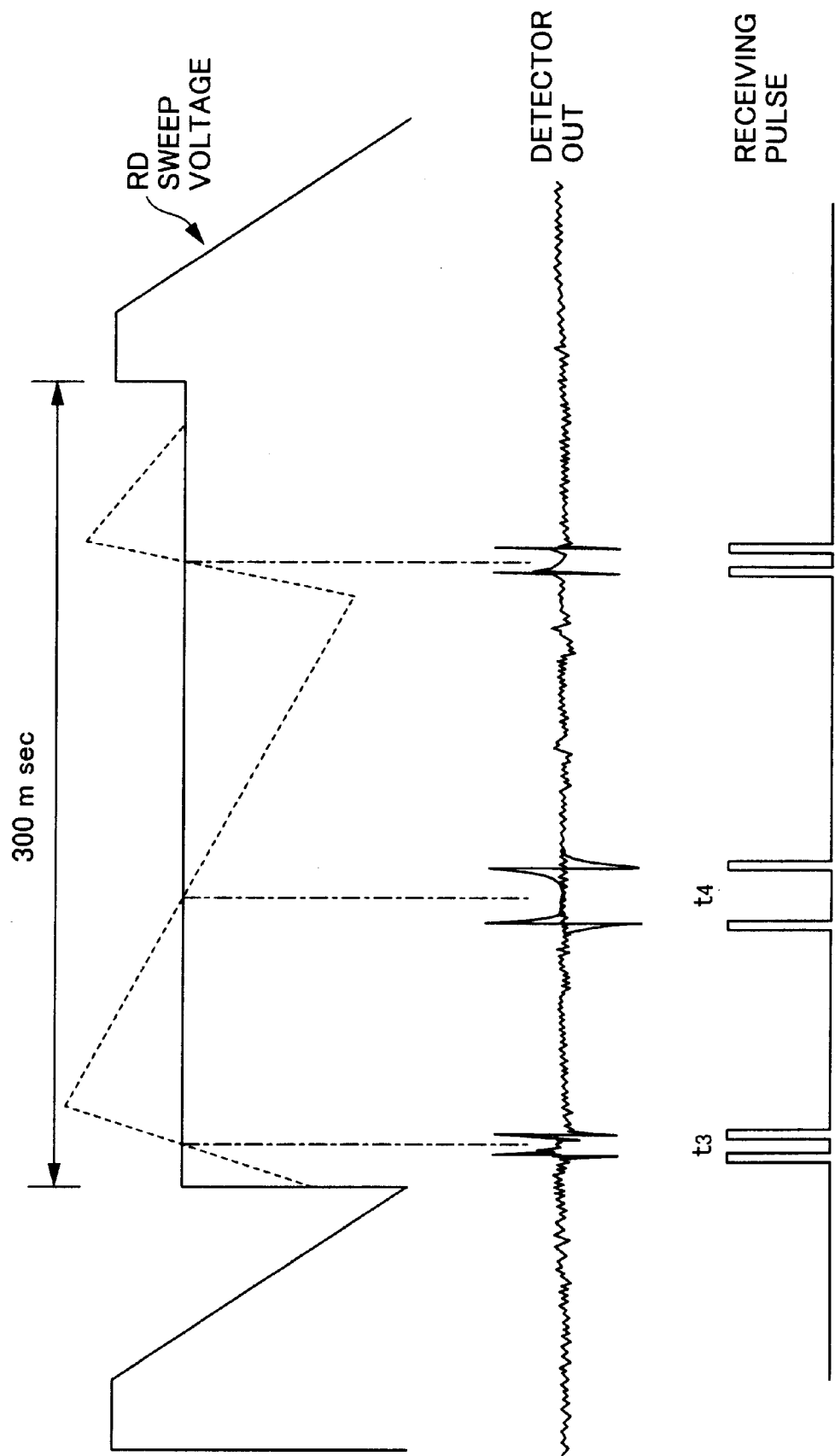
FIG. 9 is a diagram illustrating operations in a microwave detector.

Consequently, as shown in FIG. 8, in the case where the sweep signal is a triangular wave, because the rate of ascent and the rate of descent are the same, the time interval between the intersected points of the fixed frequency is the same each time such pulses are outputted (i.e., t1=t2). On the other hand, as shown in FIG. 9, in the case where the sweep signal is a saw-tooth wave, because the rate of ascent and the rate of descent are very different from each other, the time interval between the intersected points of the fixed frequency is different each time such pulses are outputted (i.e., t3<t4).

Accordingly, by observing the output of the signal discrimination circuit 19 of the microcomputer 15 and measuring the time interval in the case where a pair of detection signals is outputted, it is possible to carry out discrimination of the reception signals by making a judgement as to whether or not such time interval changes. Then, in the present embodiment, in the case where a reverse detector is judged to be present, the system outputs an alarm. On the other hand, in the case where another microwave detector is judged to be present, the system returns to normal operations.

METHOD 2 (Discrimination Based on Different Sweep Rates)

The sweep rate of local oscillators included in three-band microwave detectors capable of detecting X band, K band and Ka band is relatively slow compared with the sweep rate of the local oscillator of a reverse detector. Further, the sweep rate of local oscillators included in two-band microwave detectors capable of detecting X band and K band is relatively fast compared with the sweep rate of the local oscillator of a reverse detector. In this regard, as the sweep rate becomes faster, the spacing between the points intersecting the prescribed frequency become shorter. Thus, in the present embodiment, a process like that described below is carried out.

First, the sweeping operation of the first local oscillator 3 is suspended, and then the first local oscillator 3 is made to oscillate at a fixed frequency for a prescribed period of time. At this time, it is possible to select any fixed frequency, but taking such factors as each of the above-described processes and the arrangement of such process into consideration, it is possible to generate an oscillation at 12.10 GHz for 300 ms.

Further, the microcomputer 15 counts the number of times a pair of detection signals are outputted during the period in which oscillation is carried out at the fixed frequency, namely, the number of signals received, and then if such number lies within a preset range, a reverse detector is judged to be present. On the other hand, if the number of received signals lies outside such range, the signals are judged to be from another microwave detector. In this connection, FIG. 8 shows an example of a specific number, in which signals are received 5~6 times for the case of a reverse detector. Accordingly, if a margin of 1 is used for such detection range of 5~6 times, it is possible to establish a preset range of 4~7 times. Further, as shown in FIG. 9, in the case of a three-band microwave detector, because the sweep rate is relatively slow, the three times that the fixed frequency is intersected within the 300 ms period is relatively small, and because this number lies outside the detection range described above, the signals are judged to be from a microwave detector.

In regards to the two methods of discriminating between a reverse detector and a microwave detector described above, it is possible to use just one of such methods for making a judgement, or both methods can be used in which a judgement is made collectively based on the results of each method.

Processes after Discrimination

Even though descriptions were given separately for the various processes described above, after discriminating the type of signal, the microcomputer 15 collectively carries out the following processes:

(1) In the case where a microwave from a Doppler radar is detected, a prescribed alarm is outputted.

(2) In the case where a reverse detector is discriminated, an alarm is outputted. At this time, the alarm that is outputted may be the same alarm outputted for the case where a microwave from a typical Doppler radar is detected, but in the present embodiment a different alarm is outputted. In this connection, instead of using a type of buzzer, this different alarm may be outputted in the form of an audio message from a speaker. Further, by using the LED 24, it is possible to change the form of the output and the method itself. Thus, in the present invention, even when the first local oscillator 3 is made to oscillate, because a reverse detector can not carry out a reverse detection on the microwaves leaking from the local oscillator 3, it becomes possible to continuously cover each band and carry out a search for the presence or absence of a reverse detector.

(3) In the case where a microwave detector is discriminated, no alarm is outputted. In this way, it is possible to prevent the generation of a false alarm.

As described above, in the microwave detector according to the present invention, because the sweep frequency range of the first local oscillator 3 is shifted by an appropriate amount, the frequency of the microwaves leaking out from the first local oscillator 3 are shifted away from the reception range of reverse detectors and therefore can not be detected by the reverse detection. Further, because the frequency of the second local oscillators 10, 11 change in response to the change in the frequency of the first local oscillator 3, by preparing a plurality of different frequencies for the second local oscillators 10, 11, appropriate switching operations can be used to make it possible to search a plurality of bands.

What is claimed is:

1. A microwave detector for detecting a swept wave having a swept frequency in a prescribed frequency range from a signal in an output of an antenna, comprising:

a first local oscillator for producing a main local oscillator signal having a frequency that is swept in a range outside the prescribed frequency range during a search mode and a frequency that is constant during a determination mode;

a first mixer for mixing the signal at the output of the antenna with the main local oscillator signal to produce an output;

a plurality of second local oscillators each outputting a signal;

a second mixer for mixing the output of the first mixer with at least one of the signals of the second local oscillators and for producing an output;

a first switching means having at least a first input position for receiving the output of the first mixer, a second input position for receiving the output of the second mixer, and an output;

a detector for receiving the output of the first switching means to provide a detection output when a wave is detected;

a microcomputer for placing the first local oscillator in one of the search mode and the determination mode based on the detection output, the microcomputer including judgement means for judging whether the detected wave has a swept frequency during the determination mode.

2. The microwave detector of claim 1, wherein the prescribe frequency range includes at least a portion of one of the frequency ranges of 11.8 GHz~12.5 GHz and 10.72 GHz~11.3 GHz.

3. The microwave detector of claim 1, wherein the detection output includes detection signals, and wherein the judgement means judges whether the detected wave has a swept frequency based on an interrelationship of the detection signals.

4. The microwave detector of claim 3, wherein the interrelationship includes a change in time interval of pairs of detection signals.

5. The microwave detector of claim 4 further comprising a first alarm in the case where a wave is detected that is determined to have a swept frequency, and a second alarm different from the first alarm in the case where a wave is detected that is determined to not have a swept frequency.

6. The microwave detector of claim 3, wherein the interrelationship includes a number of times a pair of detection signals is generated within a prescribed time interval.

7. The microwave detector of claim 6 further comprising a first alarm in the case where a wave is detected that is determined to have a swept frequency, and a second alarm different from the first alarm in the case where a wave is detected that is determined to not have a swept frequency.

8. The microwave detector of claim 3 further comprising a first alarm in the case where a wave is detected that is determined to have a swept frequency, and a second alarm different from the first alarm in the case where a wave is detected that is determined to not have a swept frequency.

9. The microwave detector of claim 1, further comprising an alarm for outputting an alarm when a swept wave is detected.

10. The microwave detector of claim 1, wherein the microcomputer further includes a function to discriminate between a triangle swept wave and a sawtooth swept wave.

11. A method for detecting a wave from a signal in an output of an antenna comprising:

driving a first local oscillator to output a first local oscillator signal having a swept frequency;

mixing the first local oscillator signal with the output of the antenna to produce a mixed signal;

if a frequency of the mixed signal sweeps through a preset reference frequency band, determining that a wave is detected; and if a wave is detected, driving the first local oscillator at a preset first frequency, and then determining whether the detected wave is of a swept frequency.

12. The method of claim 11, wherein driving includes switching between a single super-heterodyne mode and a double super-heterodyne mode.

13. The method of claim 11, further comprising sounding an alarm if the detected wave is determined to be of a swept frequency.

14. The method of claim 11, wherein determining that a wave is detected is performed by generating at least one detection pulse, and determining whether the detected wave is of a swept frequency is by generating at least one more detection pulse.

15. The method of claim 11, further comprising:

timing a first time interval between a first pair of two generated detection pulses;

timing a second time interval between a second pair of two generated detection pulses; and if the first time interval equals the second time interval determining that a detected wave is a triangle swept wave.

* * * * *

UNITED STATES PATENT AND TRADEMARK OFFICE
CERTIFICATE OF CORRECTION

PATENT NO.     : 6,154,166
DATED          : November 28, 2000
INVENTOR(S)    : Sawada et al.

It is certified that error appears in the above-identified patent and that said Letters Patent is hereby corrected as shown below:

Column 2, line 17 and Column 3, line 19,
Delete the text beginning "In particular, the specific microwave frequency…" and end with "based on such established frequency range."

Column 10,
Line 32, "local oscillator 1" should read -- local oscillator 11 --.

Signed and Sealed this

Tenth Day of December, 2002

JAMES E. ROGAN
*Director of the United States Patent and Trademark Office*